United States Patent
Hayes et al.

(10) Patent No.: US 11,448,467 B1
(45) Date of Patent: Sep. 20, 2022

(54) MICRO-TUBE METAL MATRIX HEAT EXCHANGER AND METHOD OF MANUFACTURE

(71) Applicant: Clean Energy Systems, Inc., Rancho Cordova, CA (US)

(72) Inventors: William A. Hayes, Wilton, CA (US); Bradley J. Anderson, Cameron Park, CA (US)

(73) Assignee: Clean Energy Systems, Inc., Rancho Cordova, CA (US)

( * ) Notice: Subject to any disclaimer, the term of this patent is extended or adjusted under 35 U.S.C. 154(b) by 173 days.

(21) Appl. No.: 16/585,822

(22) Filed: Sep. 27, 2019

Related U.S. Application Data (60) Provisional application No. 62/738,123, filed on Sep. 28, 2018.

(51) Int. Cl.
  *F28D 7/00* (2006.01)
  *B21D 53/06* (2006.01)

(52) U.S. Cl.
  CPC .......... *F28D 7/0066* (2013.01); *B21D 53/06* (2013.01)

(58) Field of Classification Search
  CPC .... F28D 7/0066; F28D 7/0025; F28D 7/0016; F28D 7/0075; F28D 7/022; F28D 7/0008; F28D 7/008; B21D 53/06; F28F 7/02; F28F 13/00; F28F 13/003; F28F 13/006; F28F 2013/006
  See application file for complete search history.

(56) References Cited

U.S. PATENT DOCUMENTS

| | | | | |
|---|---|---|---|---|
| 1,571,068 | A | * 1/1926 | Stancliffe | F28F 7/02 165/165 |
| 3,306,353 | A | * 2/1967 | Burne | F28F 13/003 165/164 |
| 3,936,288 | A | * 2/1976 | Pei | C03B 23/207 65/33.5 |
| 3,999,602 | A | * 12/1976 | Fewell | F22B 1/063 165/70 |
| 4,676,305 | A | 6/1987 | Doty | |
| 4,925,755 | A | 5/1990 | Doty | |
| 6,668,912 | B2 | 12/2003 | Adams | |
| 8,051,902 | B2 | * 11/2011 | Kappes | F28F 9/0202 165/164 |
| 8,177,932 | B2 | 5/2012 | Becnel | |
| 2008/0271880 | A1 | * 11/2008 | Steinbauer | F28D 7/024 165/163 |

(Continued)

*Primary Examiner* — Tho V Duong
(74) *Attorney, Agent, or Firm* — Heisler & Associates (57) ABSTRACT

A heat exchanger is characterized by having two or more fluid flow circuits, each formed by multiple small cross-section "micro-tubes" contained within a surrounding metal structure, or "metal matrix." Its function is to efficiently transfer heat from one fluid to another in a highly compact assembly. Most any metal or metal alloy can be considered for the micro-tubes. The micro-tubes, while typically arranged in alternating layers of alternating flow circuits, may be organized in any number of arrangements including co-linear and at cross angles to provide for co-flow, counter flow and cross flow. The metal matrix, is provided in one embodiment by a metal or metal alloy powder consolidated in a hot isostatic pressing (HIP) process. This process also joins the tubes together and to the matrix itself, producing a monolithic structure.

16 Claims, 6 Drawing Sheets

(56) References Cited

U.S. PATENT DOCUMENTS

| | | | |
|---|---|---|---|
| 2010/0115984 A1* | 5/2010 | MacBain | F25B 29/003 62/434 |
| 2013/0206374 A1* | 8/2013 | Roisin | F28D 7/0041 165/165 |
| 2014/0076526 A1* | 3/2014 | Sakai | F28D 7/1638 165/133 |
| 2016/0290738 A1* | 10/2016 | Kupiszewski | F28F 13/12 |
| 2018/0038654 A1* | 2/2018 | Popp | F28D 7/1684 |

* cited by examiner

MICRO-TUBE METAL MATRIX HEAT EXCHANGER AND METHOD OF MANUFACTURE

CROSS-REFERENCE TO RELATED APPLICATIONS

This application claims benefit under Title 35, United States Code § 119(e) of U.S. Provisional Application No. 62/738,123 filed on Sep. 28, 2018.

FIELD OF THE INVENTION

The following invention relates to heat exchangers for transfer of heat between at least two circuits. More particularly, this invention relates to heat exchangers which route both circuits of fluids through multiple tubes within an array of tubes embedded within a solid matrix of heat transfer material.

BACKGROUND OF THE INVENTION

Compact micro-channel heat exchangers have various deficiencies, and most notably the current state-of-the-art Printed Circuit Heat Exchanger (PCHE). This type of heat exchanger is also known as a Compact Platelet Heat Exchangers (CPHX), Diffusion Bonded Micro-Channel Heat Exchangers (MCHE), Diffusion Bonded Compact Heat Exchangers (DCHE) and others.

There are numerous types of heat exchangers (HX) on the market. The traditional HX design is the shell and tube configuration as epitomized by the ubiquitous drum shaped steam boiler found in many industrial and residential installations and in early locomotives and steam ships. The major issue with this type of HX is that it suffers from a catastrophic failure mode when run at off nominal conditions. There have been numerous reports of fatal explosions with shell and tube HXs, so much so that the ASME Boiler Pressure Vessel Code was originally written in response to these disasters. The compact heat exchanger in the form of a PCHE, addressed the problem of higher pressure containment by minimizing the flow passage size and does reduce the flow inventory and overall size, but have a number of other inherent shortcomings as will be pointed out. The present invention minimizes the overpressure failure mode by not only minimizing the fluid inventory but has double, or redundant pressure containing capability.

Cost-effective, high temperature and corrosion resistant heat exchangers are a key enabling component for next generation power systems including concentrating solar power (CSP) systems and nuclear power systems, among others. Current CSP systems utilize molten nitrate salts as both the primary heat transfer fluid (HTF) and as the thermal energy storage (TES) media, operating at temperatures less than 600° C. due to decomposition limits. Next generation CSP systems are expected to operate at temperatures in the range of 700-800° C. and take advantage of advanced power cycles such as supercritical carbon dioxide ($sCO_2$) Brayton cycles. To support these higher temperatures, molten chloride salts have been identified as a probable next generation HTF. While possessing high decomposition temperatures and desirable thermal properties, these salts have highly corrosive properties, exacerbated by the high operating temperatures, thus producing an aggressive environment.

Advanced nuclear power systems are also expected to operate at temperatures in excess of 700° C. and take advantage of advanced power cycles such as supercritical carbon dioxide ($sCO_2$) Brayton cycles. To support this, molten salts have been identified as the probable heat transfer fluid. These salts have highly corrosive properties, exacerbated by the high operating temperatures, producing an aggressive environment.

Aggravating the material problem is the fact that the salts used in the nuclear applications have differing corrosive properties. The current solution is to select a compromise material that tries to satisfy the corrosion problem for both circuits. Conventional HXs are of the shell and tube (S&T) configuration. These HXs are big, bulky, and expensive when employing the required materials and thicknesses necessary to support advanced high temperature, high pressure $sCO_2$ power cycles.

The aggressive environments produced by molten fluoride/chloride salts are typically addressed by employing high temperature and/or high corrosion resistant alloys as materials of construction; examples include Inconel 600, 617 and 625, and Haynes 214, 230 and 242, and even alloys including refractory materials such as tantalum and tungsten. But these materials can be cost prohibitive, especially when coupled with the large volume required for traditional S&T type heat exchangers.

State-of-the-art compact diffusion bonded HXs, like the Printed Circuit Heat Exchangers (PCHE) or Compact Platelet Heat Exchangers (CPHXs), such as those provided by Clean Energy Systems, Inc. of Rancho Cordova, Calif., have been proposed but have yet to be fully developed and implemented for this application. Aggressive environments are typically addressed by adopting high temperature and/or high corrosion resistant alloys, which are traditionally high cost and may not be the best solution for either circuit. The significant disadvantage of such an approach, for either S&T or diffusion bonded HXs, is the large volume of high cost material required, much of which does not come in direct contact with the corrosive media.

Review of the designs of current HX types readily shows that very little of the material required for construction is in direct contact with the corrosive environment of a molten salts used in CSP or nuclear applications. This leads to the desire to make the majority of the structure from a cheaper, structurally adequate material, while using a corrosion resistant material for the wetted surfaces only. Others have sought to solve this problem with coatings and claddings that in themselves present additional problems of uniformity, assured coverage, and peeling or flaking after thermal cycling. The current invention proposes a radically different approach that will improve the compactness while significantly reducing the cost when compared to current diffusion bonded heat exchanger technology and shell and tube technologies in equivalent services.

The largest current market for PCHE type compact heat exchangers is the off-shore oil and gas industry. Their high pressure capability and compact size make them attractive for this application, especially when located shipboard or on an off shore platform. The major complaints and concerns from the users with this style of HX are the cost, lead time and what can be limited life. The inherent pressurized and non-inspectable parting line that exists in a PCHE provides a built in failure sight. On the manufacturing side, the processes used to produce a PCHE are inefficient, highly specialized and environmentally challenging. Approximately 40% or more of the material of construction is chemically dissolved during the process with reclamation difficult to impossible. The chemicals involved in the processing are highly toxic and dangerous, requiring special equipment and processing procedures. During diffusion bonding of a PCHE, applying the load evenly to the contact interface to form bonds of uniformly high quality can be a great challenge. The present invention addresses each of these concerns.

PCHEs, as discussed above, are the current state of the art. Some micro-tube HXs do exist but appear to have only one circuit constructed from tubes with the area external to the tube flooded with the second fluid circuit—ie. mini-shell and tube. The following patents were found that may be relevant.

1. U.S. Pat. No. 3,306,353 describes a porous sintered matrix that uses the matrix as the flow field for the second circuit, opposite the tubular circuit.

2. U.S. Pat. No. 6,668,912 describes a cast metal composite matrix around a tubular core, but again appears to have a single tubular circuit.

3. U.S. Pat. No. 8,177,932 describes a method for manufacturing a micro-tube heat exchanger.

4. U.S. Pat. Nos. 4,928,755 and 4,676,305 describe micro-tube stripe heat exchangers.

Additive manufacturing, in the form of 3D printing, is being used to produce heat exchangers. Current metal 3D printing, which deposits materials in layers, does not readily allow for the selective materials that are available with the current invention. This is a significant limitation of 3D printing. From those in the industry that are using this process, we find that there are currently numerous issues that need to be addressed. They include:

1. Lack of dimensional control/configuration limitations; especially in horizontal channels.
2. Lack of consistency in deposited and processed material properties.
3. Size limitations.
4. Long fabrication time for large devices.
5. Residual stress, exacerbated by size.

Accordingly, a need exists for an improved micro-channel heat exchanger, especially when handling corrosive fluids at high temperatures and/or pressures. Such a heat exchanger would also benefit from a method of manufacture which is easy to operate and avoids waste, by being a largely additive process.

SUMMARY OF THE INVENTION

The present invention is generally in the category of a compact micro-channel heat exchanger. Its function is to efficiently transfer heat from one fluid to another in a highly compact assembly. Multi-fluid heat exchangers are used in virtually every industry including: space heating, refrigeration, air conditioning, power stations, chemical plants, petrochemical plants, petroleum refineries, natural-gas processing and aerospace. Compact micro-channel heat exchangers are especially desirable where high pressure and/or high temperatures are involved and/or where space is at a premium and/or where high effectiveness for improved cycle efficiency is desired. An example is heat exchangers used on off shore oil platforms.

The present invention may best be described as a "micro-tube metal matrix heat exchanger." The micro-tube metal matrix heat exchanger concept is fabricated by a combination of processes in what is effectively an additive manufacturing approach.

The micro-tube metal matrix heat exchanger is characterized as having two or more fluid flow circuits formed by multiple small cross-section "micro-tubes" contained within a surrounding metal structure, or "metal matrix." Though not limited to round cross-section, if they were round, the tubes would typically range in inside diameter from ~.010" to ~0.250" although these values are not intended to indicate a limitation. The wall thicknesses of the tubes typically range from 0.002" to 0.060" although these values are not intended to indicate a limitation. Most any metal or metal alloy can be considered for the micro-tubes.

The micro-tubes are typically arranged in alternating layers of alternating flow circuits and may be organized in any number of arrangements including co-linear and at angles relative to the adjacent layer, up to and including 90 degrees. In heat exchanger parlance these arrangements provide for co-flow, counter flow and cross flow; combinations of all three are also possible within the micro-tube metal matrix heat exchanger. Woven patterns as exist in mesh screens, wire cloth and fabrics are also possible. These woven patterns are not limited to 2-D configurations but can also be 3-D.

The matrix is formed by filling the interstices between tubes with fine metal powder and then sintering and compacting the assembly in a hot isostatic pressing (HIP) process. This process joins the tubes together and to the matrix itself, producing a monolithic structure.

OBJECTS OF THE INVENTION

Accordingly, a primary object of the present invention is to provide a heat exchanger to exchange heat, especially with at least one high pressure, high temperature and/or highly corrosive fluid, over to a second fluid.

The novel HX of this invention has many favorable attributes which include:

1. The ability to segregate and contain exchanger fluids in a dedicated and minimized volume of material appropriate to the fluid contained, i.e. it allows for multi-material construction. For corrosive media, this minimized volume will be a high temperature and/or corrosion resistant material. For the opposite circuit, which may be a non-aggressive media, low cost material can be employed.

2. Three materials or components separate unlike flows (tube walls of the first circuit, tube walls of the second circuit and a metal matrix between the two circuits.

3. Utilizes proven, environmentally favorable manufacturing processes and materials which have either been adopted, or are in the process of being adopted, by ASME (American Society of Mechanical Engineers).

4. High pressure integrity, with both primary and secondary containment.

5. Compactness and effectiveness greater than PCHE (CPHX). Preliminary estimates are 15% to 25% greater.

6. Significantly lower cost than currently employed heat exchanger technologies. Preliminary estimates are 25% to 50% lower cost than PCHEs/CPHXs in equivalent service.

7. Shorter fabrication and lead times than currently employed heat exchanger technologies.

8. The ability to segregate and contain exchanger fluids in a dedicated and minimized volume of material appropriate to the fluid contained.

9. Allows the use of low cost materials where applicable.

10. Uses predominantly additive manufacturing processes.

11. Extreme compactness and higher effectiveness than current state-of-the-art compact heat exchangers such as Printed Circuit Heat Exchangers (PCHEs) or Compact Platelet Heat Exchangers (CPHX).

The need for the novel HX is manifold as compact micro-channel heat exchangers (CMHE) have become prevalent and enabling devices for many industries. The current state-of-the-art in CMHEs is the printed circuit heat exchanger or PCHE as produced and marketed by a small number of companies around the globe. The major issues associated with this type of CMHE are the cost, lead time and limitations in materials of construction and operation. The novel micro-tube metal matrix heat exchanger addresses each of these issues and more.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIGS. 6 and 7) is directed to a heat exchanger according to one embodiment of this invention which is made up of multiple layers 25, 45 of first tubes 30 and second tubes 50 which together make up a circuit A 20 and a circuit B 40 passing through the heat exchanger 10. The array 100 of tubes 30, 50, have gap space therebetween filled with a matrix 60 of metal powder which is solidified, such as by action of a hot isostatic press to solidify the metal matrix 60 with the array 100 of tubes 30, 50 embedded therein. Such a configuration allows for different materials to be used for circuit A and/or circuit B and for the metal matrix 60, and so that the heat exchanger can provide optimal corrosion resistance, heat transfer properties, thermal properties, pressure containment properties and customization.

Figure 5:
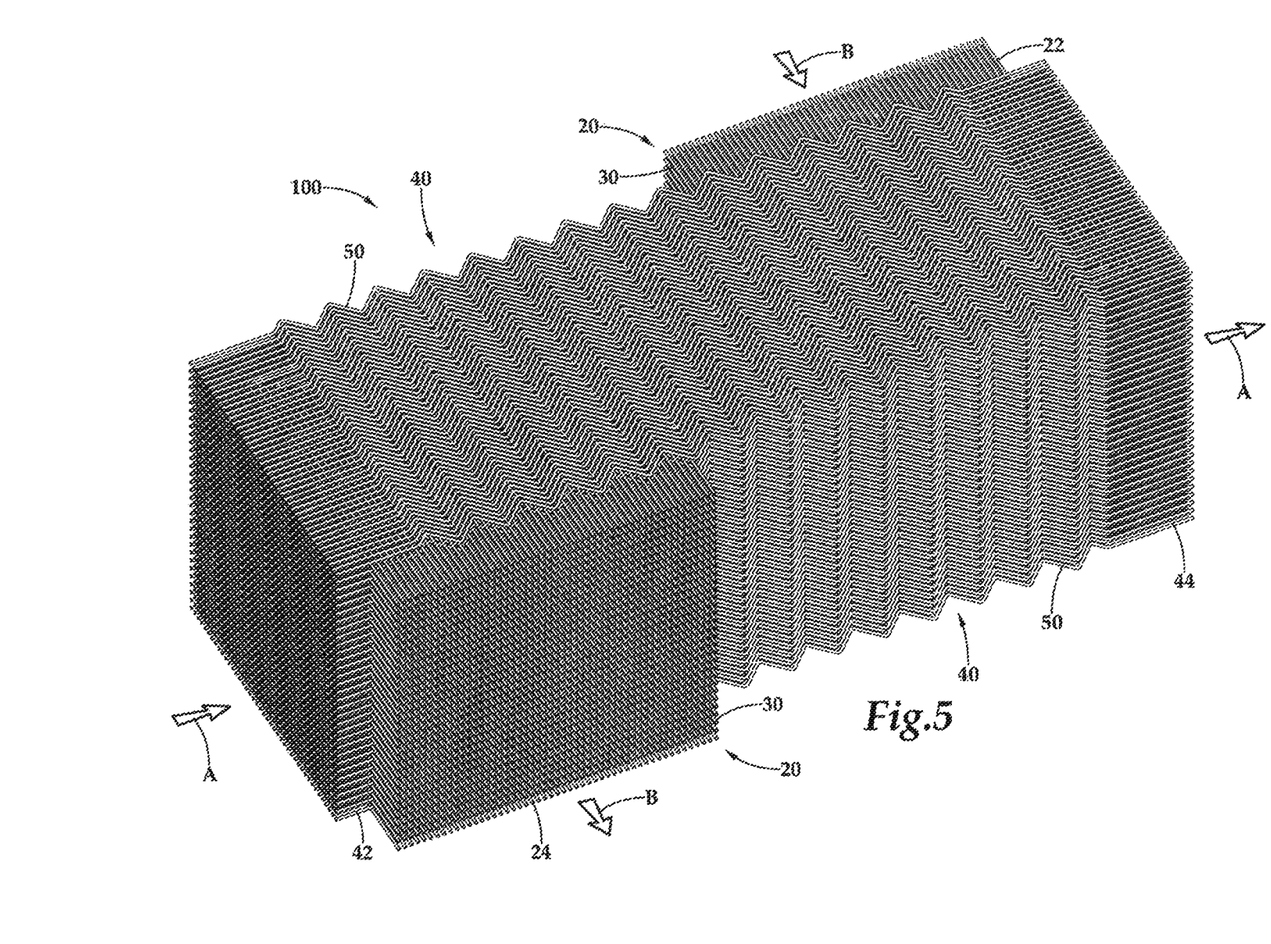
FIG. 5 is a perspective view of an array of tubes including a set of tubes of circuit A within multiple layers and interposed with multiple layers of tubes within circuit B, similar to that which is shown in FIG. 2, but with multiple repeating patterns of layers of tubes of circuit A and tubes of circuit B, to complete the entire array of tubes, and before addition of metal powder and completion of the metal matrix in which the array of tubes is embedded.
Figure 6:
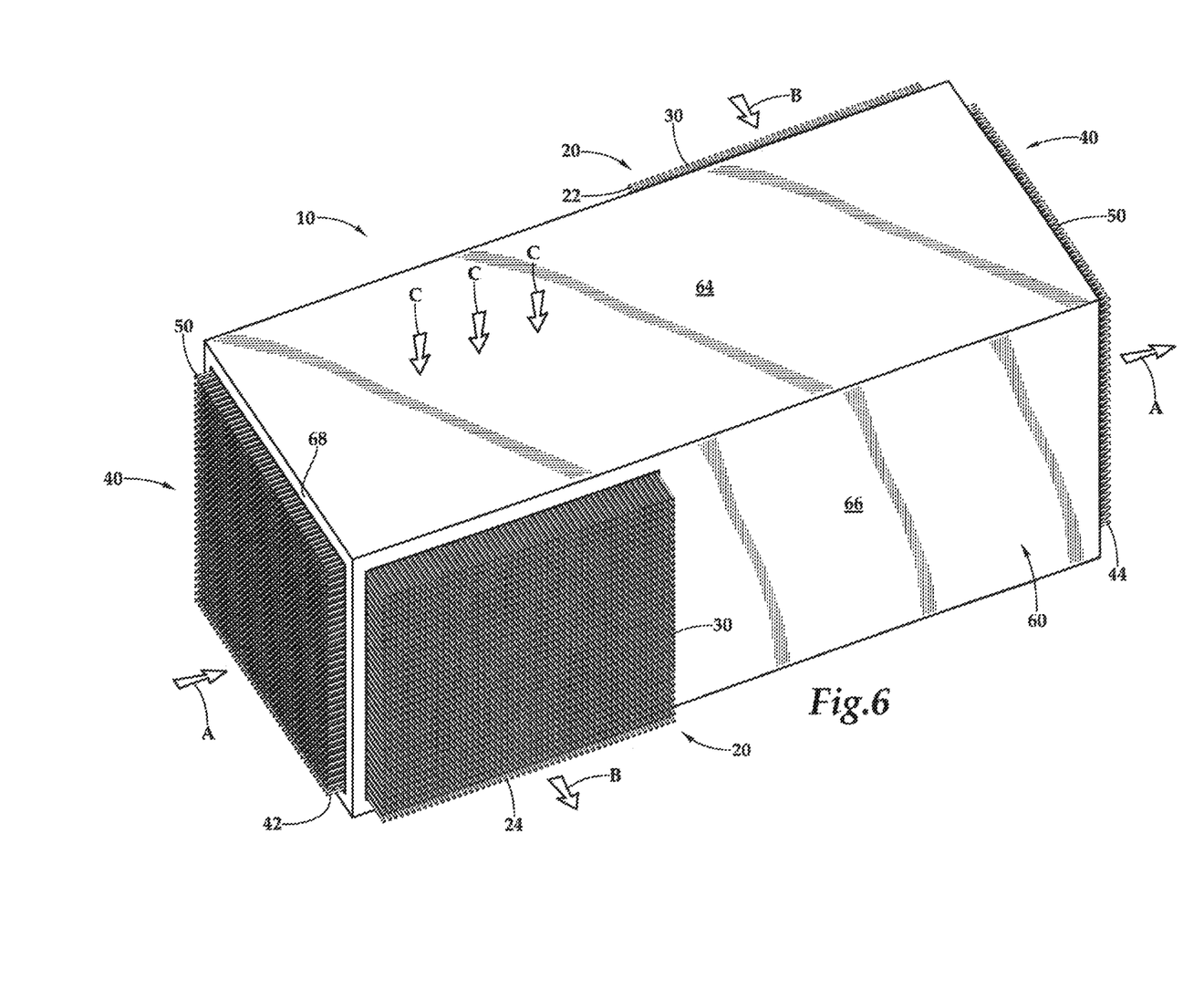
FIG. 6 is a perspective view of that which is shown in FIG. 5 after addition of powder between the various tubes within the array of tubes, and after heating and/or applying pressure to the powder filling gaps space within the array of tubes to solidify the matrix of metal powder in which the array of tubes is embedded, and completing the heat exchanger of this invention, except for addition of manifolds to supply and remove fluids passing along circuit A and circuit B through the heat exchanger.
Figure 7:
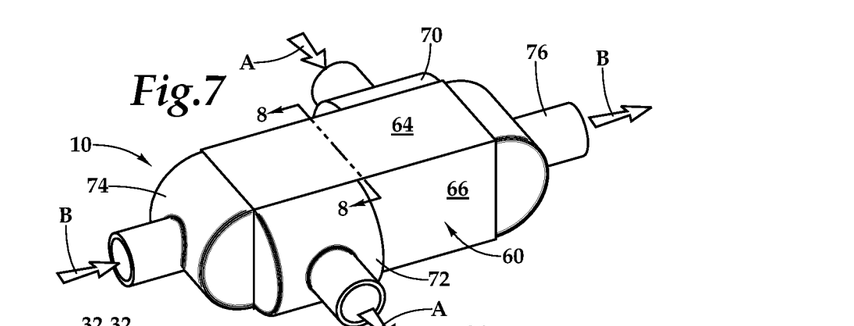
FIG. 7 is a perspective view of the heat exchanger of this invention, according to one embodiment, and similar to that which is shown in FIG. 6, but with the addition of manifolds for delivery and removal of fluids along circuit A and along circuit B, through the heat exchanger.

In essence, and with particular reference to FIGS. 5-7, basic details of the heat exchanger 10 are described, according to one embodiment of this invention. The array 100 of tubes includes first tubes 30 provided in multiple separate layers 25, which together comprise circuit A 20. The array 100 also includes second tubes 50 provided in multiple separate layers 45 which together comprise circuit B 40. Gap space between the tubes 30, 50 of the array 100 are filled with a metal matrix 60. The first tubes 30, second tubes 50 and metal matrix 60 are made up of at least two different materials, and optionally three different materials.

To form the heat exchanger 10, in one embodiment, first tubes are arranged in a first layer 25, followed by second tubes 50 within a layer 45. Another layer 25 of first tubes 30 is then provided, followed by another layer 45 of second tubes 50. This process is repeated until a full array 100 of tubes 30, 50 have been provided. Space between the tubes 30, 50 is filled with metal powder 62 to fully embed the tubes 30, 50, except for at ends thereof. The assembly is then placed within a hot isostatic press (or other heat and/or temperature applying equipment) and the powder 62 is sintered or otherwise solidified into a solid matrix 60 within which the array 100 of tubes 30, 50 are embedded. Finally, manifolds 70, 72, 74, 76 are placed over ends of the tubes 30, 50 from similar circuits 20, 40 for supply and removal of fluids passing through the heat exchanger 10.

The novel HX of the present invention is described as a micro-tube metal matrix heat exchanger, a completed version of which is shown in FIG. 7. This particular representation is of a counter or co-flow arrangement. Cross-flow and multiple circuits (i.e. greater than two) are also possible.

Figure 8:
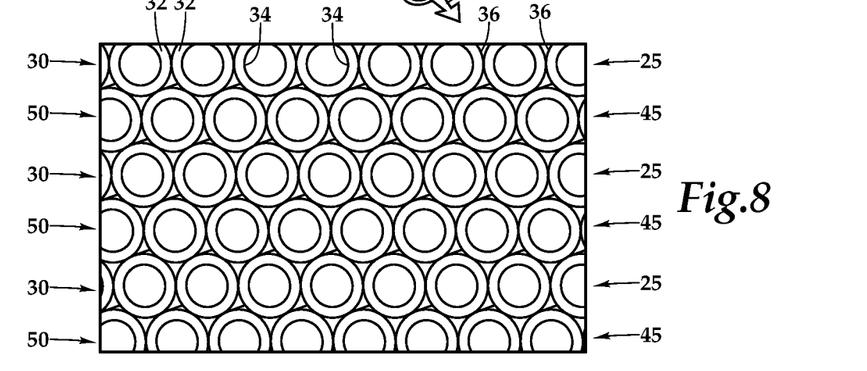
FIG. 8 is a sectional view take a long line 8-8 of FIG. 7 and illustrating how layers of tubes within multiple separate circuits can be close packed together to minimize gap space therebetween.
Figure 9:
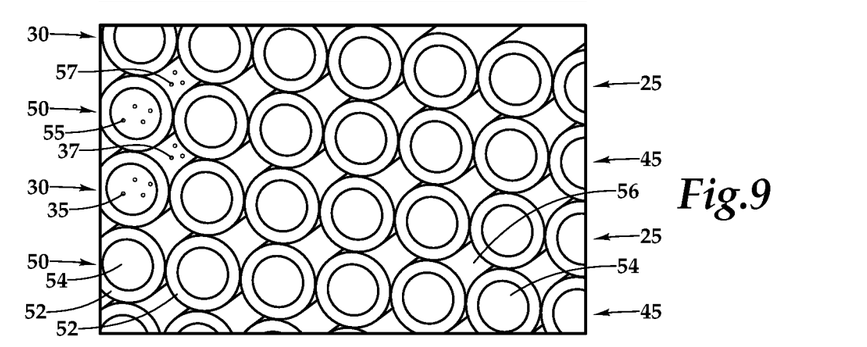
FIG. 9 is a sectional view similar to that which is shown in FIG. 8, but in an alternative embodiment where separate layers of tubes are oriented body centered relative to adjacent layers, and enlarging gap space between the tubes within the array of tubes in this alternative environment.
Figure 10:
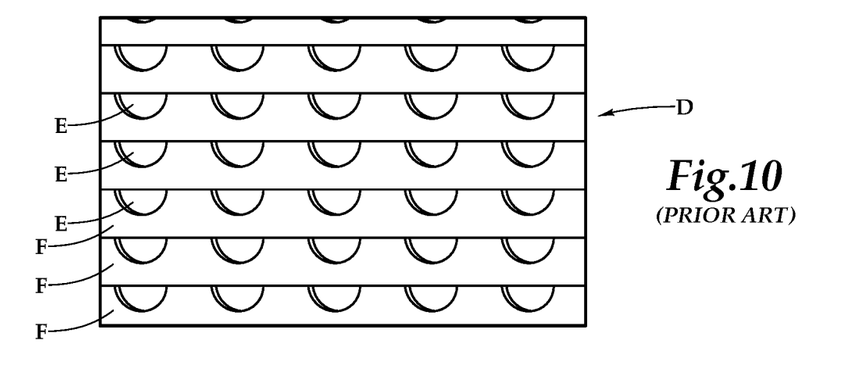
FIG. 10 is a sectional view similar to that which is shown in FIGS. 8 and 9, but illustrating how a prior art typical PCHE has non-circular channels provided within separate layers following and additive 3-D printing type process, according to the prior art.

Although similar in outer appearance to other compact heat exchangers such as PCHEs/CPHXs, there are significant differences in the design and layout of the heat exchanger 10 internal passages as illustrated by FIGS. 8-10. And while other heat exchangers have used micro-tubing to create small passages, the heat exchanger 10 of this invention incorporates a metal matrix 60 for additional structural strength. The heat exchanger core is constructed from an assembly of micro-tubes 30, 50, surrounded by a metal matrix 60. The tubes 30, 50, which are commercially available in sizes and materials of interest, are formed to the desired shape, e.g. a wavy pattern to promote turbulence is shown in FIGS. 1-4 and laid or woven in layers 25, 45. While round tubes are shown, different cross-sections are also possible. FIGS. 8 and 9 show two potential layouts, a planar packaging (FIG. 9) and a close packed hexagonal packing (FIG. 8). The latter packaging provides the closest possible packing for tubes 30, 50 of an identical outside diameter, and thus are the most efficient from a compactness and heat transfer standpoint. The matrix is formed by filling the interstices between tubes 30, 50 with fine metal powder 60 and then sintering and compacting the assembly in a hot isostatic pressing (HIP) process.

The layouts of FIGS. 8-10 have been scaled so as to provide the same hydraulic diameter for the three configurations and thus essentially the same pressure drop, all else being equal. It can be seen that a higher density of flow channels and a closer distance of approach between circuits is possible with the heat exchanger 10 when compared to the PCHE/CPHX D. Coupled with the round cross-section of the heat exchanger 10 of this invention, this packing provides for optimal heat transfer. For the same flow area there is an increase of around 16% in the hydraulic diameter. The circular cross-section also provides a more optimal structural configuration. It can also be seen, from a particulate plugging standpoint, the heat exchanger 10 tube 30, 50 configurations provide a larger passageway than the semi-circular cross-section E of the PCHE D, for the similar pressure drop, thus providing a more robust functional design. The semi-circular cross-section E of the PCHE D produces a non-optimal configuration from a structural standpoint and has the interlayer parting line at the corner, producing a stress riser. The circular heat exchanger 10 configuration shown in FIGS. 8 and 9 is generally preferred, especially from a structural standpoint.

In the heat exchanger 10, primary structural integrity is provided by the tube 30, 50 walls 32, 52, with secondary structure provided by the metal matrix 60, intrinsically producing a more robust design than that available from the planer diffusion bonded PCHE/CPHX D, due to redundancy. The HIP processing of the heat exchanger 10 bonds the tubes 30, 50 and matrix 60 together, to produce a monolithic structure.

As mentioned, the tubes from which the heat exchanger 10 are produced are commercially available as either fractional or hypodermic tubing 30, 50. While both welded and seamless extruded tubing are available, seamless is the preferred embodiment from a structural standpoint, but with the supporting matrix 60, welded tubing 30, 50 will be acceptable for certain applications. Stainless steel, nickel based alloys and even refractory alloys are available in the sizes and wall 32, 52 thicknesses of interest and custom materials are readily produced. Tube 30, 50 configurations can also be varied to enhance heat transfer. Along with the wavy tubes 12 previously described, tubes 30, 50 can have internal protuberances and/or be twisted or otherwise configured to enhance heat transfer while minimizing pressure drop. Internal protuberances can be formed by simply dimpling the tube 30, 50 from the outside.

With the heat exchanger 10 construction, it is possible to mix materials to provide the optimal selection for corrosion and thermal compatibility and cost effectiveness with the respective circuit 20, 40 fluids at desired service temperatures. For example, for a fluoride molten salt HX that is coupled with $H_2O$ (Rankine cycle) or $sCO_2$ (Brayton cycle) at temperatures in excess of 700° C., a high nickel alloy tube 30, 50 can be used on the salt circuit while lower cost stainless steel tubes 50, 30 can be applied to the opposite circuit, all contained within a low-cost stainless steel matrix 60. A significant advantage when compared to a typical PCHE/CPHX D that would require fabrication entirely from the high cost material. For another example, a type of molten salt reactor that utilizes two types of salts, e.g. fuel salts and chloride/fluoride salts, as a means of transferring heat from the reactor to secondary heat exchanger would inherently require two different types of corrosion resistant materials to combat the differing corrosion issues associated with the two types of salts.

An additional benefit of the heat exchanger 10 technology of this invention lies in the tolerance available from the use of tubing 30, 50 to form the passageways. The inside diameter of the micro-tubing used, in the sizes of interest, are expected to vary ~+/−0.002" or less. For an equivalent sized passage in a PCHE D or CPHX, the variation would be approximately double this amount. This tolerance control leads to a lower variation in pressure drop and improved performance.

The process for producing the matrix 60 is well-known, typically referred to as Powder Metallurgy-Hot Isostatic Pressing or PM-HIP. This process is used to make powder metallurgy billets and near-net components. Considerable interest and effort has been expended by the nuclear industry to investigate and allow PM-HIP components for pressure containing devices such as valve bodies and pump housings. The aerospace industry has also investigated and utilizes the process. As mentioned, the matrix 60 can be selected from any number of low cost alloys compatible with the process and application but it can also be a material such as copper or other high conductivity material to enhance heat transfer.

While a fully densified matrix 60 has been discussed so far, a compliant matrix 60 is also possible. One method to produce this would be low temperature sintering. This process would leave voids in the matrix 60 that would reduce its stiffness and aid compliance if required for the desired application.

Heat exchanger 10 core (FIGS. 2, 5 and 6) fabrication can be viewed as primarily additive manufacturing processing, making highly efficient use of resources and the materials of construction. The tubes 30, 50 are fabricated in an extrusion or roll and welding process; the matrix powder 60 is produced in a combination of mechanical, thermal and chemical processes; and the joining or assembly takes place in the HIP process. Essentially 100% of the input material is used in making the heat exchanger 10. Machining of the matrix 60 for attachment of manifolds 70, 72, 74, 76 is the only subtractive process. By contrast, in a PCHE/CPHX D, a significant amount of the original sheet material is machined away prior to assembly—material waste that cannot be recouped. This can be as much as 40% of material removal.

In summary, the multiple attributes of the heat exchanger 10 make it ideal for cost-effective, high temperature and corrosion resistant heat exchangers for next generation applications and existing applications requiring high performance at low cost. The approach makes efficient use of dedicated materials to address corrosion and cost issues while utilizing available technologies and manufacturing processes.

Figures 1, 2:
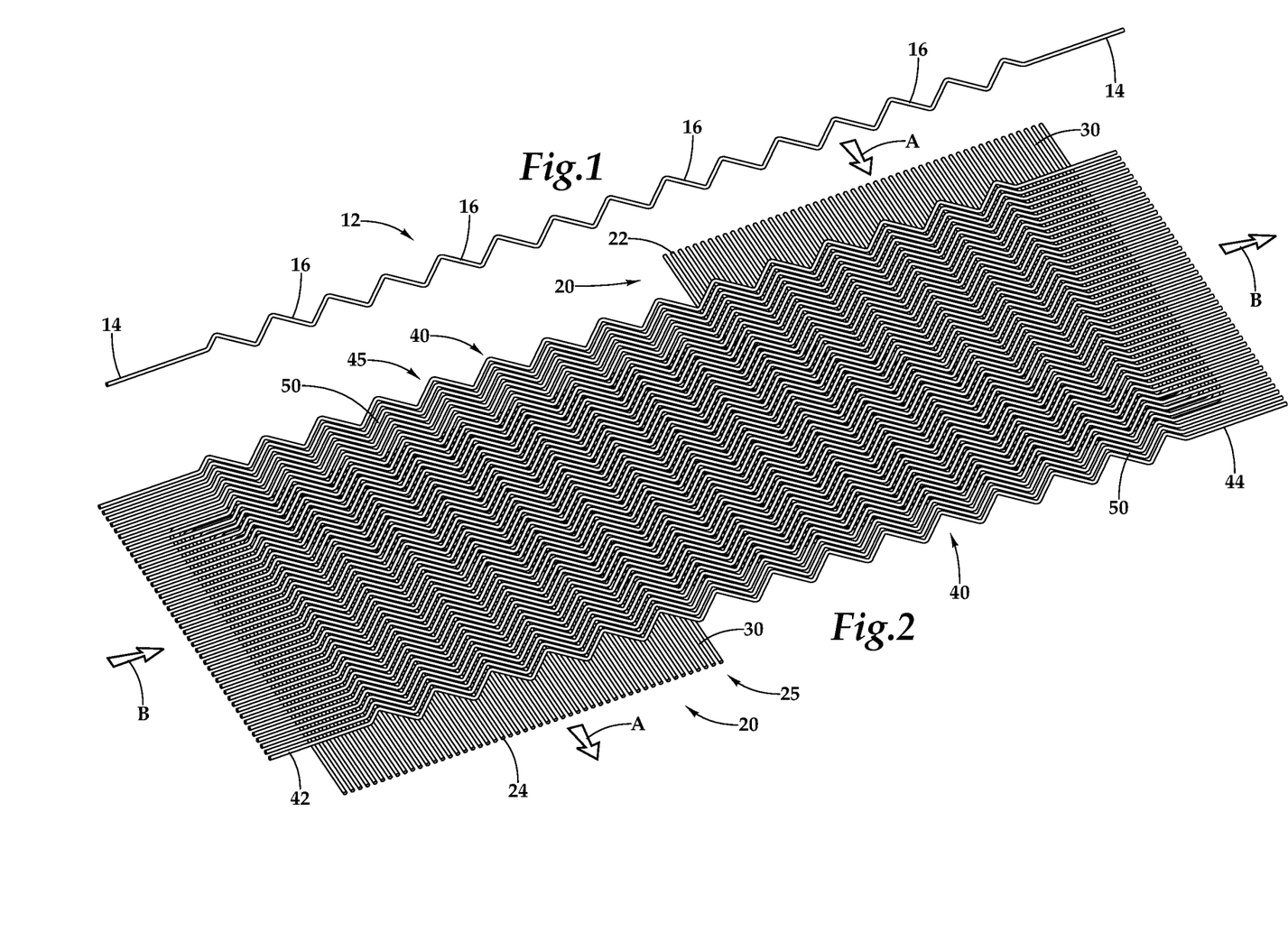
FIG. 1 is a perspective view of a single tube within one embodiment of the heat exchanger of this invention, with the tube featuring bends therein to promote turbulent flow and greater heat transfer. The shape of the tube can be varied. For instance, the cross-section can be non-circular, and the bend radii, pitch and amplitude can be varied to optimize heat transfer, while minimizing pressure drop or for other purposes.
FIG. 2 is a perspective view of two layers of tubes within an array of tubes of the heat exchanger, according to one embodiment of this invention. A first layer of tubes is part of a circuit A and the second layer of tubes on top of the first layer of tubes is part of a circuit B. In the embodiment shown, tubes within circuit B feature bends therein while tubes within circuit A are straight, except they bend near ends thereof to exit the array of tubes on sides of the array of tubes lateral to where the tubes of circuit B enter and exit the array.
Figures 12, 13:
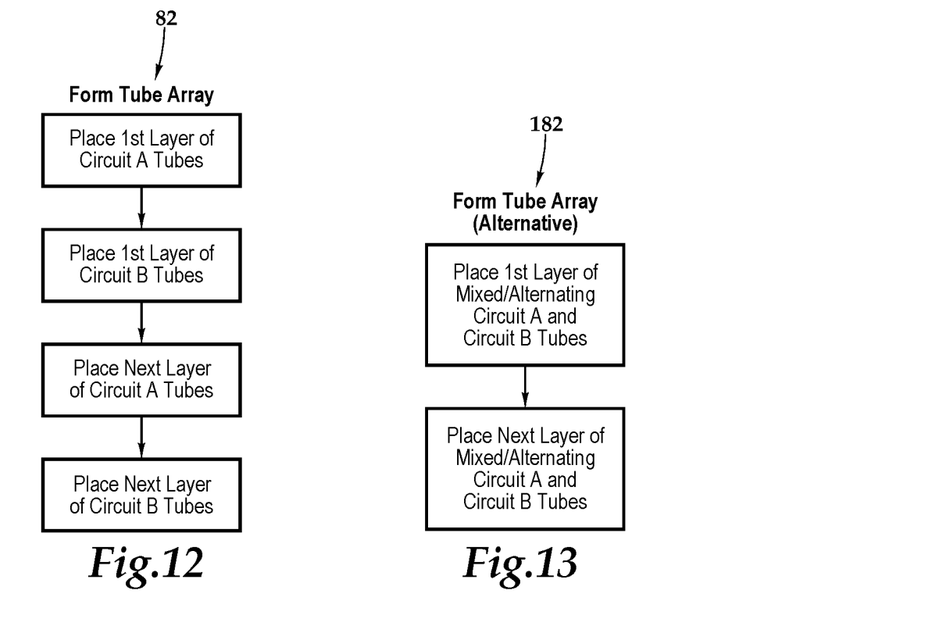
FIG. 12 is a flow chart illustrating details of a first step in the manufacturing method to FIG. 11.
FIG. 13 is a flowchart illustrating an alternative embodiment of that which is depicted in FIG. 12.

More specifically, and with particular reference to FIGS. 1 and 2, basic details of individual tubes 12 within the heat exchanger 10 (FIGS. 6 and 7) are described, according to an exemplary embodiment. The individual tubes 12 extend between ends 14 and have a hollow interior through which a fluid can be conducted. In one embodiment, bends 16 are provided at regular intervals between the ends 14. Such bends 16 can increase turbulence and promote heat transfer, such as by disturbing any boundary layer of the fluid adjacent to an interior wall of the individual tubes 12. In some embodiments, such as with the lower layer 25 within FIG. 2, individual tubes can be straight, rather than having bends 16 therein. These first tubes 30 within layer 25 depicted in FIG. 12 are straight, except near ends 22, 24 thereof where they bend one time to allow an inlet end 22 and outlet end 24 of circuit A 20 to extend out of lateral sides of the heat exchanger 10, rather than out of ends of the heat exchanger 10 where circuit B 40 tubes 50 exit heat exchanger 10. In this way, separate manifolds 70, 72, 74, 76 (FIG. 7) can easily be attached to the heat exchanger 10 to feed fluids to the circuits 20, 40 (along arrows A and B) and remove fluids from the circuits 20, 40.

Each of the first tubes 30 within the layer 25 extend from an inlet end 22 to an outlet end 24. Similarly, each of the second tubes 50 within the layer 45 including an entry 42 opposite an exit 44. The layers 25, 45 provide portions of separate circuits 20, 40 passing through the heat exchanger 10. These ends 22, 24 and entry/exit 42, 44 are grouped together at locations on the heat exchanger 10 separate from other groupings, so that manifolds 70, 72, 74, 76 can most conveniently be attached to the heat exchanger 10.

While in this one embodiment (FIG. 2) one layer 25 is shown with straight tubes 30 and the other layer 45 is shown with tubes 50 featuring bends 16, the tubes 30, 50 could all be straight, or could all have bends 16 therein, or could otherwise be configured within the layers 25, 45. As another alternative, layers 25, 45 could each be formed of a mixture of tubes 30, 50, associated with different circuits 20, 40.

Figure 3:
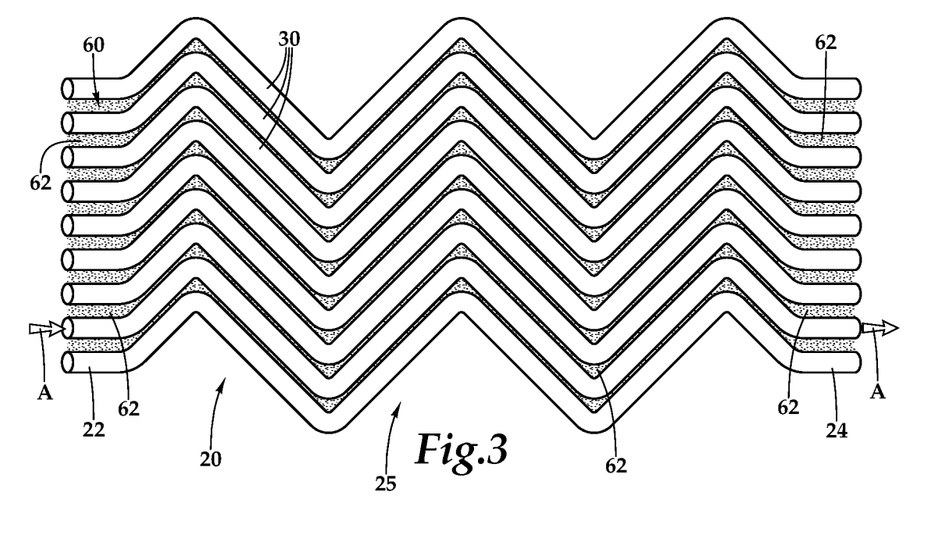
FIG. 3 is a top plan view of a single layer of tubes within circuit A, and with metal matrix powder shown between the tubes.
Figure 4:
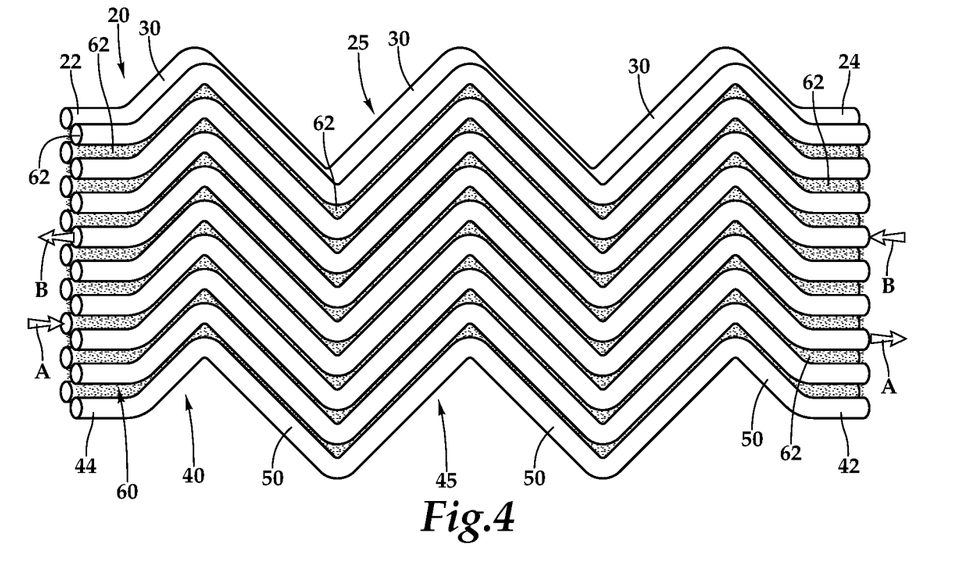
FIG. 4 is a top plan view of two layers of tubes with a lower layer of tubes within circuit A and with an upper layer of tubes within circuit B, and with metal powder shown between the tubes of each layer and between the layers.

With particular reference to FIGS. 3 and 4, further details of these layers 25, 45 of tubes 30, 50 are depicted. Powder 62 which is later solidified into the metal matrix 60 are shown within FIGS. 3 and 4. In one embodiment, this powder 62 is laid down along with placement of layers 25 of first tubes 30 and layers 45 of second tubes 50 within the two circuits 20, 40, to most effectively ensure that metal power 62 is uniformly placed, filling all voids between the tubes 30, 50. FIGS. 3 and 4 illustrate further how in one embodiment all of the tubes 30 of the layer 25 and second tubes 50 of the layer 45 can feature bends 16 therein in one embodiment. Such an arrangement can facilitate close packing (FIG. 8) between the layers, while configurations where some layers 25 have straight tubes 30 and other layers 45 have tubes 50 with bends 16 therein best facilitate body centered arrangements between layers such as that depicted in FIG. 9.

Which particular reference to FIGS. 8 and 9, further details of the tubes 30, 50 are described, according to various different embodiments. In FIG. 8 tubes 30 of the layer 25 and the tubes 50 of the layer 45 are close packed together to minimize gap space and to maximize contact between adjacent tubes within the array 100 (FIG. 5) of tubes 30, 50 making up the heat exchanger 10. In contrast, in FIG. 9 a body centered arrangement is provided between tubes 30, 50 of the various layers 25, 45, increasing gap space and facilitating a wide variety of arrangements of tubes 30, 50 within layers 25, 45.

Each of the first tubes 30 is made up of walls 32 having a wall thickness defined by a distance between an inner surface 34 and an outer surface 36. Inner surfaces 34 define that portion of the first tube 30 which are in direct contact with fluids passing through the tubes 30 of circuit A 40. The outer surface 36 comes into contact with second tubes 50 as well as with other first tubes 30 in typical embodiments, and into contact with the metal matrix 60 which fills gaps between the tubes 30, 50.

Thickness of these walls 32 can be made thinner than might otherwise be the case to handle pressures of fluids passing therethrough, because the walls 32 are supported on an exterior side thereof by the matrix 60, as well as by adjacent tubes 30, 50. Furthermore, thinner walls can save on exotic material costs which might be utilized to handle challenging fluid characteristics including corrosiveness, and extremes of temperature and pressure, when the heat exchanger 10 is operating as intended, or when experiencing off design states of operation.

While each of the first tubes 30 are shown with a circular cross-section, these first tubes 30 could alternatively have some other cross-section, such as a square cross-section or other cross-sectional form. In one embodiment, protuberances 35 extend inwardly from the inner surface 34 of the walls 32. Such protuberances can promote turbulence and improve heat transfer effectiveness. In one embodiment, such protuberances 35 are formed by forming dimples 37 on the outer surface 36, and with the walls 32 being sufficiently thin that the dimples 37 extend through the walls 32 to leave the protuberances 35 on the inner surface 34.

Similar to the first tubes 30, the second tubes 50 also include walls 52 bounded by an inner surface 54 opposite an outer surface 56, and with optional protuberances 55 and/or dimples 57 thereon. Other characteristics of the second tubes 50 can vary in a manner similar to that described above with respect the first tubes 30. Typically, the second tubes 50 are formed from a different material than that from which the first tubes 30 are formed. In one embodiment, one of the fluids passing through the heat exchanger 10 is non-corrosive, or less corrosive, or corrosive in a different way than the tubes 30 of the alternate circuit within heat exchanger 10. The tubes 50 can thus be optimized for the fluid they are containing, and to minimize cost. In one embodiment, the second tubes 50 can be formed of a similar material from which the matrix 60 is formed. As another alternative, the first tubes 30 and second tubes 50 can be formed of a common material which is different from that of the metal matrix 60.

While the tubes 30, 50 have been described as being within two circuits 20, 40, it is conceivable that more than two circuits 20, 40 might be provided in an alternative heat exchanger. For instance, a heat exchanger might be configured which exchanges heat between three different fluids passing through three different circuits, while each of the different circuits could be made of tubes formed of similar or different materials to the materials forming the other tubes of the other circuits and providing the matrix 60.

With particular reference to FIG. 10, a prior art PCHE D cross-section is shown to contrast with the cross-sections of the arrays 100 of tubes 30, 50 according to embodiments of this invention. To facilitate 3-D printing thereof, the channels E are typically non-circular in form and less optimally configured. Also, opportunities to utilize lower cost and/or less corrosive materials at strategic locations are not facilitated, or made significantly more complex (such as with coatings, etc.).

With particular reference to FIGS. 5-7, details of the metal matrix 60 and manifold 70 are described, according to an exemplary embodiment. In a preferred environment, the matrix 60 begins as powder 62 placed between tubes 30, 50 within the array 100. Typically this powder 62 is a metal powder selected for appropriate heating and temperature performance, as well as suitable heat transfer performance and cost minimization, as well as structural strength, especially when high-pressure containment is to be provided by the matrix 60 (at least as a backup). Typically this powder 62 is applied while the array 100 of tubes is already within a press having a mold cavity shaped similar to a desired final shape for a heat exchanger 10. Force, such as provided by a press platen from above (along arrow C of FIG. 6) can be applied to this matrix 60, along with heat, in a hot isostatic press to sinter and/or otherwise solidify (such as by fully melting) the powder 62 into a solid matrix 60.

The heat exchanger 10 can then be removed from the press. Finally, ends of the first tubes 30 and second tubes 50 within the two circuits 20, 40 can be ground if necessary or otherwise cut to final size (if needed), and manifolds can be added. In particular, the first inlet manifold 70 can overlay inlet end 22 of circuit A 20. A first outlet manifold 72 can be placed over the outlet end 24 of tubes 30 of circuit A 20. A second inlet manifold 74 can be placed over entry end 42 of second tubes 50 within circuit B 40. A second outlet manifold 76 can be placed over exit 44 ends of the second tubes 50 within circuit B 40. The manifolds 70, 72, 74, 76 facilitate flow along the various circuits 20, 40 including circuit A flow along arrow A and circuit B flow along arrow B. While these arrows generally illustrate counterflow, other forms of flow could be provided by rearranging the tubes 30, 40 within the heat exchanger 10 or adjacent plumbing.

Figure 11:
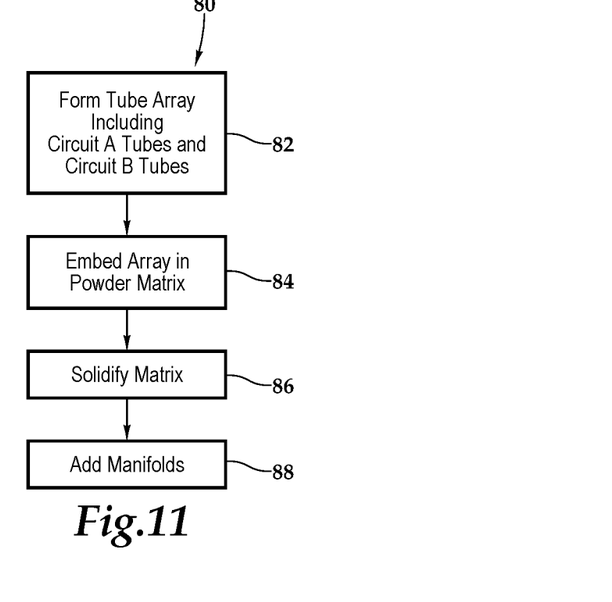
FIG. 11 is a flow chart illustrating steps in one method of manufacturing the heat exchanger of FIGS. 6 and 7, according to one embodiment of this invention.

FIGS. 11-13 illustrate steps in the manufacturing process described above. An overview of the process of manufacture 80 includes first forming the tube array including circuit A tubes 30 and circuit B tubes 50, as step 82. This is followed by embedding the array in powder matrix 60, according to step 84. The matrix is been solidified according to step 86. Finally, manifolds are added according to step 88. This first step 82 in the manufacturing method 80 can be broken down in one embodiment shown in FIG. 12. An alternative tube array placement process 182 is depicted in FIG. 13. A variety of other alternative placement steps could be provided according to alternative embodiments. As an alternative to adding the powder matrix after fully forming up the tube 30, 50 array 100, the powder could be applied as the layers 25, 45 are built up. While matrix solidification is described primarily as utilizing a hot isostatic press, it is conceivable that temperature alone could be utilized to sinter or otherwise heat into a solid form the matrix 60. The matrix 60 could be solidified by other means, such as utilizing some form of binding agent as a further alternative.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A compact heat exchanger, comprising in combination:
a first set of a plurality of tubes formed of a first material;
a second set of a plurality of tubes formed of a second material;
a matrix of a third material located between said first set of tubes and said second set of tubes, said third material distinct from at least said first material; and
wherein said first material and said second material are different from each other wherein said heat exchanger includes two pairs of opposing faces including two opposing side faces and two opposing end faces, said opposing side faces supporting opposing ends of each of said first set of tubes, said opposing end faces supporting opposing ends of each of said second set of tubes, said first set of tube having central portions thereof extending parallel with central portions of said second set of tubes.

2. The heat exchanger of claim 1 wherein said matrix is a metal matrix of metal powder sintered into said matrix.

3. The heat exchanger of claim 1 wherein said third material has a sintering temperature which is lower than a melting point of said first material.

4. The heat exchanger of claim 1 wherein said first set of tubes have a circular cross-section.

5. The heat exchanger of claim 1 wherein said first set of tubes and said second set of tubes are arranged with elongate central axes thereof parallel to each other.

6. The heat exchanger of claim 5 wherein said first set of tubes and said second set of tubes are arranged in planar layers which alternate with each other.

7. The heat exchanger of claim 6 wherein said first set of tubes and said second set of tubes are arranged with each tube of each said set of tubes spaced vertically or horizontally from adjacent tubes.

8. The heat exchanger of claim 1 wherein said first set of tubes and said second set of tubes are arranged in a counterflow relationship within the heat exchanger.

9. The heat exchanger of claim 1 wherein said first set of tubes and said second set of tubes are arranged in a co-flow relationship within the heat exchanger.

10. The heat exchanger of claim 1 wherein said first set of tubes and said second set of tubes are arranged in a crossflow relationship within the heat exchanger.

11. The heat exchanger of claim 1 wherein at least said first set of tubes includes protuberances on an inside surface of said first set of tubes, said protuberances enhancing a surface area of said inside surface of said first set of tubes relative to a plain cylindrical inside surface.

12. The heat exchanger of claim 1 wherein said first set of tubes includes said central portions thereof extending in a direction parallel to a plane of said lateral faces, said first set of tubes including inlet portions thereof and outlet portions thereof between said central portions and said lateral faces which are oriented perpendicular to a plane of said lateral faces.

13. The heat exchanger of claim 1 wherein said first set of tubes has at least portions thereof each including a similar series of regularly spaced bends between ends of each of said first set of tubes.

14. The heat exchanger of claim 13 wherein said second set of tubes has at least portions of at least some tubes thereof each including a similar series of regularly spaced bends between ends of each of said second set of tubes, said first set of tubes and said second set of tubes having a similar form to maintain a parallel relationship along at least portions thereof which include said series of regularly spaced bends therein.

15. The heat exchanger of claim 13 wherein said regularly spaced bends of said first set of tubes are spaced from each other by linear sections of said first set of tubes, such that said first set of tubes have a zig-zag form.

16. The heat exchanger of claim 1 wherein said central portions of said first set of tubes and said central portions of said second set of tubes exhibit a close packed hexagonal relationship with at least one of said second set of tubes in physical contact with at least two of said first set of tubes.

* * * * *